United States Patent [19]

Readal

[11] 4,094,496
[45] June 13, 1978

[54] ENCLOSURE FOR STEEL CONVERTING APPARATUS

[75] Inventor: John P. Readal, Allison Park, Pa.

[73] Assignee: Pennsylvania Engineering Corporation, Pittsburgh, Pa.

[21] Appl. No.: 645,535

[22] Filed: Dec. 31, 1975

[51] Int. Cl.² .............................................. C21C 5/46
[52] U.S. Cl. ................................... 266/142; 266/158; 266/282
[58] Field of Search ............... 266/142, 144, 158, 279, 266/280, 282; 110/1 A; 432/247

[56] References Cited

U.S. PATENT DOCUMENTS

| | | | |
|---|---|---|---|
| 1,629,689 | 5/1927 | Fahrenwald | 266/282 X |
| 1,643,766 | 9/1927 | Fahrenwald | 266/282 X |
| 1,798,460 | 3/1931 | Fahrenwald | 266/282 X |
| 3,743,264 | 7/1973 | Baum et al. | 266/158 |

FOREIGN PATENT DOCUMENTS

| | | | |
|---|---|---|---|
| 658,043 | 2/1963 | Canada | 266/282 |
| 1,533,272 | 5/1970 | Germany | 266/282 |

Primary Examiner—Roy Lake
Assistant Examiner—Paul A. Bell
Attorney, Agent, or Firm—Fred Wiviott

[57] ABSTRACT

An open-topped vessel for converting molten ferrous metal to steel is pivotal about a horizontal axis and has bottom tuyeres for blowing oxygen or other gases upwardly through molten metal. An enclosure at least partially surrounds the vessel and cooperates with a smoke hood to prevent the escape of pollutants when the vessel is in its vertical position. A pair of access doors are provided for closing an opening provided in the enclosure laterally of the vessel tilt axis and are mounted for movement in opposite directions. An auxiliary smoke hood is mounted in the enclosure above the opening for capturing pollutants when the vessel is tilted toward said opening for being charged. The inner surface of the doors are formed of a plurality of self-mounted cast iron plates.

2 Claims, 4 Drawing Figures

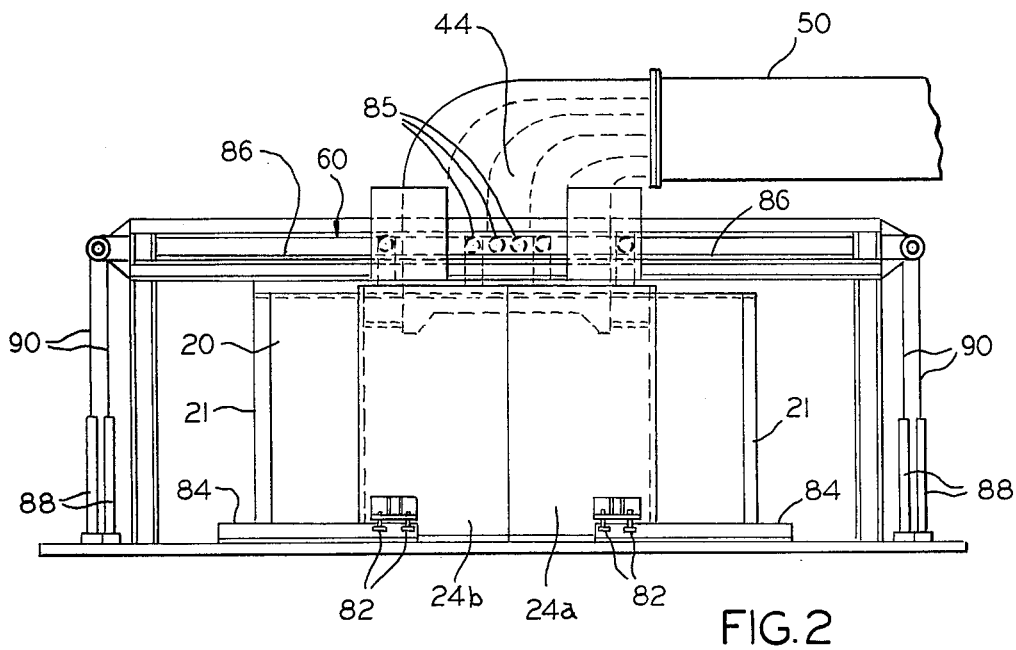
FIG. 2
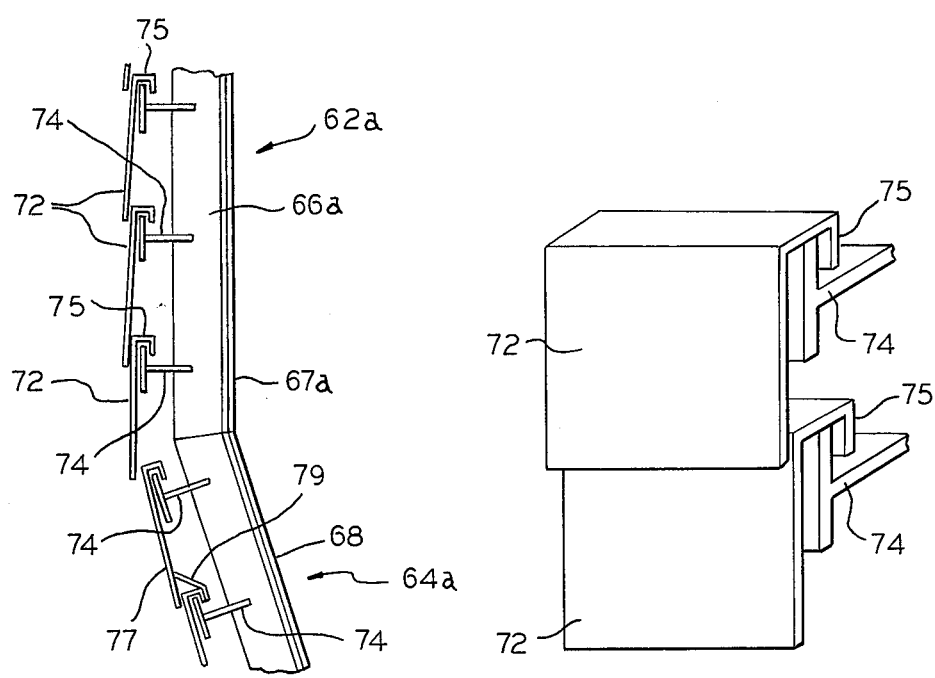
FIG. 3
FIG. 4

ENCLOSURE FOR STEEL CONVERTING APPARATUS

BACKGROUND OF THE INVENTION

This invention relates to enclosures for steel conversion apparatus.

One type of steel conversion apparatus includes an open-topped vessel having tuyeres extending through its lower end for injecting oxygen beneath the level of molten metal within the vessel. In addition, a hydrocarbon shielding fluid, such as light oil, natural gas or propane, is injected in surrounding relation to the oxygen for prolonging tuyere life. As a result of the reactions within the vessel and the disassociation of the shielding fluid, pollutant gases and particulate material are discharged from the open upper end of the vessel. In order to prevent the discharge of these pollutants, such vessels are often provided with a smoke hood coupled to a gas cleaning system. Such smoke hoods are normally disposed above the open upper end of the vessel and are incapable of completely collecting off-gases when the vessel is tilted for receiving hot metal or scrap. Accordingly, an enclosure may be provided around the vessel for preventing discharge of pollutants during such charging operations. An access door in one side of the enclosure may be opened and closed for periodic charging. It is necessary in the performance of various portions of the process cycle to pivot the vessel away from its smoke hood. During at least a portion of these vessel turn-up and turn-down operations, the open mouth of the vessel is directed toward the access doors with the result that molten metal and slag, which are discharged from the vessel as a result of factors such as spitting, tend to collect on the doors.

SUMMARY OF THE INVENTION

A general object of the invention is to provide a new and improved enclosure door for the enclosures of steel conversion vessels.

A further object of the invention is to provide a new and improved access door for steel converter enclosures which inhibits the collection of metal and slag and permits the same to be removed readily.

These and other objects and advantages of the present invention will become more apparent from the detailed description thereof taken with the accompanying drawings.

BRIEF DESCRIPTION OF THE DRAWINGS

FIG. 2 is a front elevational view of a portion of the apparatus illustrated in FIG. 1;

FIG. 3 illustrates a portion of the access door of the enclosure illustrated in FIG. 1; and FIG. 4 is a perspective view of a portion of the door illustrated in FIG. 3.

DESCRIPTION OF THE PREFERRED EMBODIMENT

Figure 1:
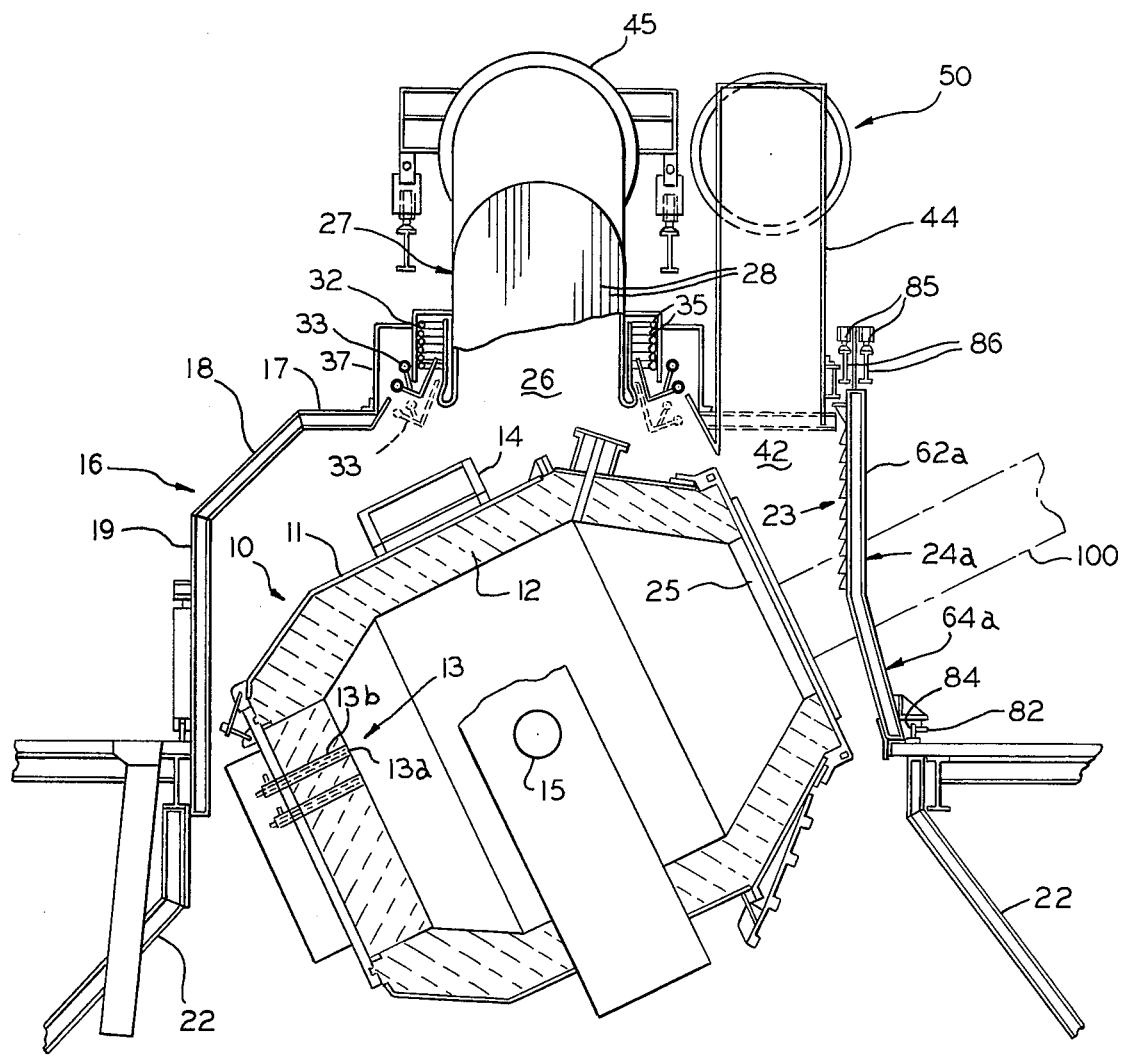
FIG. 1 is a front elevational view, partly in section, of a converter vessel and off-gas collecting system.

The invention will be illustrated and discussed with respect to a bottom blown converter vessel 10 shown in FIG. 1 although those skilled in the art will appreciate that it has application to other types of conversion vessels as well, such as basic oxygen and argon-oxygen systems.

The vessel 10 has an opening 25 at its upper end and includes a metallic shell 11 and refractory lining 12. A plurality of tuyeres 13 extends through the lower end of the vessel and includes an inner tuyere pipe 13a and an outer tuyere pipe 13b to permit the injection of oxygen and a hydrocarbon shielding fluid as will be discussed more fully below. Converter vessels of the type illustrated are generally supported in a conventional manner on a trunnion ring 14 which has a trunnion pin 15 extending from each of its opposite sides. The trunnion pins 15 are suitably supported in a well-known manner on conventional bearing structures (not shown) and are coupled to a suitable drive mechanism (not shown) for tilting the vessel to each of a plurality of positions as may be required during a process cycle.

The vessel 10 is shown in FIG. 1 to be disposed within a metallic enclosure 16 having a top wall 17 disposed above the upper end of the vessel and an inclined back wall portion 18 extending downwardly and outwardly from the top wall 17 and to the upper end of a vertical back wall portion 19. In addition, as seen in FIG. 2, the enclosure 16 includes a front wall 20 and generally vertical end walls 21. Skirt portions 22 extend downwardly and outwardly from the lower ends of the back and front walls 19 and 20. A generally rectangular opening 23 is formed in front wall 20 and to one side of and generally parallel to the axis of the trunnion pins 15. A closure door assembly 24 is mounted for movement into and out of a closed position relative to the opening 23.

A top opening 26 is formed in top wall 17 for receiving a smoke hood 27 which is preferably water cooled and may be formed of a plurality of individual, longitudinally extending pipes 28 each connected to inlet and outlet manifolds (not shown). The passage of smoke hood 27 through opening 26 may also be water cooled by means of a helical pipe or pipes 32 which are also connected to inlet and outlet manifold pipes (not shown). A movable skirt 33 is disposed in surrounding relation to the lower end of the hood 27 and is movable by means (not shown) between its positions shown by full lines to its position shown by broken lines in FIG. 1. A first annular housing 35 surrounds pipes 32 and the upper portion of movable skirt 33 when the latter is in its elevated position. In addition, a second generally annular inverted housing 37 is affixed to the outer surface of housing 35 and to the cover 17 in surrounding relation to opening 26.

A second opening 42 is formed in cover 17 at a point above the access opening 23 for receiving the lower end of an auxiliary smoke hood 44. As those skilled in the art will appreciate, the primary smoke hood 27 is coupled by a conduit 45 to a gas cleaning system, not shown, but which may, for example, include a quencher (not shown) and a gas scrubber (not shown). The quencher and the gas scrubber may be of the variable throat venturi type of wet scrubbers which are well known in the art and which function to remove particulates and lower the off-gas temperature. In addition, means such as a fan (not shown) is coupled to the scrubber for creating a suction under the hood 27 and within the enclosure 16. For a more complete description of the gas cleaning apparatus which may be connected to the smoke hood 27, reference is made to copending application, Ser. No. 340,302, filed Mar. 12, 1973 and assigned to the assignee of the present invention. The auxiliary smoke hood is connected by a second conduit 50 and a valve (not shown) into the gas cleaning system between the quencher and gas scrubber.

The door assembly 24 may comprise two doors 24a and 24b which are mounted for generally horizontal movement away from each other on a support assembly 60. The doors 24a and 24b are identical and accordingly, only door 24a will be described in detail for the sake of brevity. Door 24a includes an upper, generally rectangular, vertically extending portion 62a and a second generally rectangular portion 64a affixed to the lower end of portion 62a and extending obliquely outwardly therefrom to permit the vessel 10 to rotate. The door portions 62a and 64a are defined by an outer metallic frame 66a having the general configuration of the door 24a and rectangular metallic plates 67a and 68a affixed to the outer sides of frame 66a.

The inside surface of the upper door portion 62a is defined by a plurality of metallic, shingle-like plates 72, each of which is pivotally mounted on one of a plurality of pivot support members 74 which are affixed to the frame 66a in a generally horizontal and parallel spaced relation. The members 74 are preferably coextensive relative to the width of the door 24a and are generally T-shaped in vertical section with their bases affixed to the frame 66a. Each of the plates 72 are provided with an integral hanger portion 75 extending rearwardly and downwardly from its upper end for being received on the upper edge of one arm of its associated member 74. The members 74 are located a distance apart which is slightly less than the height of the plates 72 so that the lower end of each plate 72 extends below, overlaps and rests against the upper end of the plate 72 disposed immediately therebelow. The plates 72 may have any convenient length but are preferably shorter than the members 74 so that a plurality of plates are located on each member 74 and disposed in a side-by-side relation.

It will be recalled that the lower portion 64a of door 24a extends obliquely outward to permit rotation of vessel 10. For this reason, the inside surface of the lower door is provided with plates 77 which are similar to plates 72 except that the former are provided with a hook-portion 79 at its lower end for engaging the upper end of the plate 77 immediately below. This prevents the plates 77 from hanging in a vertical position from their associated members 74 to maintain the outwardly directed configuration of door portion 64a.

The plates 72 and 77 are preferably formed of cast iron which typically contains about 3 percent carbon. The steel and slag which discharges from vessel 10 does not adhere well to cast iron so that the plates 72 and 77 will normally either not become coated or any such material which does become coated on the plates may be removed easily. In addition, because of the manner in which the plates 72 and 77 are mounted, no steel mounting brackets, bolts and the like are exposed to provide points of attachment for the metal discharged from furnace 10. Further, because the plates 72 and 77 are relatively small in size and relatively loosely mounted, they are free to expand and contract without undue stress on themselves or the members 74.

The doors 24a and 24b are each mounted for horizontal movement toward and away from each other by means of support assembly 60 which may include any suitable means such as lower rollers 82 which engage guides 84 and upper rollers 85 which engage rails 86. Suitable hydraulic motors 88 may be provided for operating doors 24a and 24b through the agency of cables 90.

In operation of the apparatus illustrated in FIGS. 1 and 2, and at the commencement of a treatment cycle, the vessel 10 will initially be pivoted to its position shown by full lines in FIG. 1 and the doors 24a and 24b will be open to permit the passage of a charging chute 100 into the open end of the vessel. The skirt 33 will also be elevated to its position shown by full lines to permit rotation of vessel 10. Initially, the vessel may be charged with hot metal and/or scrap, during which time tuyeres 13 will be above the metal level so that inert gases such as nitrogen or argon or no gas may be delivered through the tuyeres 13. In either event, the valve (not shown) which couples the auxiliary hood 44 into the gas cleaning system will be open and the vent fan (not shown) operating to withdraw any secondary emissions which may evolve from the vessel.

After the vessel 10 has been charged, it will be rotated to a vertical position with its open upper end 25 positioned below skirt 33. During this time inert gases are delivered through the tuyeres 13 and the hydraulic motors 88 are operated to close the doors 24a and 24b. When the vessel 10 has assumed its upright position and the doors 24a and 24b have been closed, the main oxygen blow may commence with oxygen being delivered through the inner tuyere pipe 13a and the hydrocarbon shielding fluid delivered through the outer tuyere pipe 13b.

During the initial portion of the oxygen blow, the skirt 33 will remain in an elevated position so that air is drawn around its lower end and into the gas cleaning system conduits so as to oxidize combustible gases initially evolving from the vessel 10 so that an inert gas plug passes through the system. When stochiometric conditions have been achieved, the skirt 33 is lowered to its position shown by broken lines to minimize the intake of air whereby combustible gases such as hydrogen and carbon monoxide which evolve from the vessel may be collected safely. In the event it is necessary to charge the vessel 10 with additional hot metal or scrap or for sampling purposes, the skirt 33 is elevated, the valve (not shown) is opened to couple the auxiliary hood 44 to the gas cleaning system (not shown) and the hydraulic motors 88 operated to reopen the doors 24a and 24b. The vessel 10 may then be rotated to its position shown by full lines in FIG. 1. If additional gas treatment is required, the just described operation is repeated. It will also be appreciated that when the treatment cycle has been completed, the vessel 10 may be inverted for discharging the metal therein into a molten metal ladle disposed below enclosure 16.

It will be appreciated from the foregoing that while the vessel is being tiled up or down, and during charging and sampling operations, materials such as slag or metal may discharge from the vessel opening and toward the interior of enclosure 17 and particularly the doors 24a and 24b. The plates 72 and 77 minimize the deposit of such material and further facilitate the removal of any material which does become deposited so that a substantial build-up does not occur.

While only a single embodiment of the invention has been disclosed and described, it is not intended to be limited thereby but only by the scope of the appended claims.

I claim:

1. A converter vessel having a metal receiving opening formed adjacent an upper end, an enclosure having an upper wall portion disposed above said vessel and side wall portions extending downwardly along the sides of said vessel, an access opening formed in one of said wall portions, door means mounted adjacent said access opening for movement into open and closed positions relative to said access opening, said vessel being mounted for pivotal movement toward and away from the access opening to permit the charging thereof, said vessel having submerged tuyeres for injecting oxygen and a hydrocarbon shielding fluid beneath the level of molten metal in said vessel and for injecting non-oxidizing gases into said metal when it is tilted toward said door means, said gas injections tending to cause materials to discharge from said metal receiving opening and to coat said door means, the improvement wherein:

said door means including a plurality of generally horizontally oriented support means disposed in vertically spaced relation, at least a substantial portion of said door means on the side thereof facing said vessel being defined by a plurality of plates individually mounted on said support means, said plates being arranged in substantially horizontal rows with a plurality of plates in each row, said plates each having hanger means at their upper ends for pivotally and slidably engaging said support means as the sole support thereof, said plates being shorter and narrower than said door and longer than the distance between said support means so that the lower ends of the plates overlap and loosely engage the upper end of the plate disposed in the row therebelow to cover the hanger means thereon, the surfaces of said plates presented to the vessel being free of projections, said plates being formed of a ferrous material having a carbon content substantially higher than steel and are individually pivotal and slidable so that each plate may be moved relative to adjacent plates to facilitate the removal of material briding the plates, said support means each comprising a plurality of members mounted on said door means and extending in parallel spaced apart relation, each of the plates in said rows being mounted on one of said members, said hanger means comprising first hook means extending over said support means, the lower portion of said door means extending obliquely outwardly away from said access opening, the lower ones of said rows of plates defining the lower portion of said door means, each of the plates in said lower rows having a second hook means formed thereon and engaging the plate in the row disposed therebelow and to limit movement away from said lower plate.

2. The combination set forth in claim 1 wherein said door means includes a frame, said support means being mounted on one side of said frame, said plates defining the inner surface of said door means and additional means mounted on the other side of said frame and spaced from said plates, said additional means substantially covering the other side of said frame and defining the outer surface of said door means.

* * * * *